United States Patent
Teague

[19]

[11] Patent Number: 5,868,437
[45] Date of Patent: Feb. 9, 1999

[54] COMPOSITE PIPE STRUCTURE

[76] Inventor: Anthony Teague, 334 E. Ilex Dr., Lake Park, Fla. 33403

[21] Appl. No.: 503,284

[22] Filed: Jul. 17, 1995

[51] Int. Cl.[6] ..................................................... F16L 11/12
[52] U.S. Cl. ................................. 285/45; 285/47; 285/55; 285/138; 285/297; 285/351; 285/354; 285/355; 285/379; 285/906; 285/911; 285/915; 138/149
[58] Field of Search ..................................... 285/911, 355, 285/138, 379, 55, 297, 47, 351, 45, 354, 906, 915; 138/149

[56] References Cited

U.S. PATENT DOCUMENTS

| | | | |
|---|---|---|---|
| 1,943,028 | 1/1934 | Rabezzana | 285/138 |
| 2,470,568 | 5/1949 | McCrumm | 284/47 X |
| 2,907,351 | 12/1955 | Rohrback et al. | 138/140 |
| 3,047,313 | 7/1962 | Bruce | 285/47 |
| 3,192,955 | 6/1965 | Buck et al. | 138/140 |
| 3,388,724 | 6/1968 | Mowell et al. | 138/140 |
| 3,677,303 | 7/1972 | Martin | 138/149 |
| 3,680,631 | 8/1972 | Allen et al. | 285/47 X |
| 3,850,453 | 11/1974 | Bentley et al. | 285/138 X |
| 4,149,239 | 4/1979 | Morris | 285/133.1 |
| 4,269,436 | 5/1981 | Medney | 285/47 |
| 4,284,297 | 8/1981 | Godkin | 285/47 |
| 4,480,371 | 11/1984 | McStravick et al. | 285/47 X |
| 4,516,608 | 5/1985 | Tutus et al. | 138/149 |
| 4,590,971 | 5/1986 | Webster et al. | 138/149 |

FOREIGN PATENT DOCUMENTS

| | | | |
|---|---|---|---|
| 269500 | 10/1950 | Switzerland | 284/911 |
| 1360732 | 7/1974 | United Kingdom | 285/133.1 |
| 2098690 | 11/1982 | United Kingdom | 285/911 |

*Primary Examiner*—Dave W. Arola
*Attorney, Agent, or Firm*—Harry W. Barron

[57] ABSTRACT

A pipeline is made by joining a number of pipe sections, each of which includes an inner pipe structure and an outer pipe structure. The outer pipe structure, which may be zinc plated or encased in an protective elastomeric material, includes mating couplings at each end to fasten similar sections together end to end. The inner pipe structure includes a hole extending throughout the pipeline and means for sealing around the hole at each joint. The inner pipe structure is resiliently mounted within the outer pipe structure. The outer pipe structure of each pipe section extends in both directions past the ends of the inner pipe structure.

21 Claims, 2 Drawing Sheets

COMPOSITE PIPE STRUCTURE

BACKGROUND OF THE INVENTION

1. Field of the Invention

This invention relates to a pipe structure in which an inner pipe is resiliently supported within an outer pipe, and, more particularly, to an improved structure for protecting an inner pipe before, during, and after installation.

2. Background Information

In various applications, composite pipe structures, made up of layers of different materials, have been used to combine the advantages of different materials in providing mechanical strength, resistance to corrosion, thermal insulation, and the like. For example, underground steel pipes have been wrapped or otherwise surrounded by non-metallic materials to prevent the corrosive effects of ground water. Oil well casings, which are formed by strings of steel pipes fastened together and lowered as the well is drilled, are typically protected by cement introduced into the annular space between the outside of the outer wall of the casing and the well bore, to prevent the migration of ground water into the well. In the petroleum industry, concrete inner liners have also been used within pipes handling corrosive liquids, such as oil field brines.

In the construction industry various types of insulation have been wrapped around metal pipes carrying hot and cold fluids, including chilled water lines, hot water lines, and coolant lines in air conditioning systems. Extruded cylinders made from elastomeric resin foams are now widely used in this way.

In the food processing and food transportation industries, glass vessels and glass lined vessels are used extensively, because glass surfaces are chemically inert in such applications. In addition, glass surfaces are preferred because glass does not contain toxic materials which can be leached into food products and because glass can be easily cleaned. Glass containers of well known types are commonly used for the storage and shipment of various types of liquid food products, and glass linings have been used with very large containers, such as, tank trucks for carrying milk or storage tanks for storing milk. The use of glass in such applications avoids corrosive processes known to occur when metallic surfaces are exposed to the weak acids present in many food substances. Such corrosive processes in a unlined metal vessel may result in the release of poisonous by products of corrosion into the food products, in the formation of corroded surfaces of the vessel which cannot be adequately cleaned, and in the ultimate destruction of a vessel.

The alternative use of resinous materials, or plastics, in food processing and transportation has been limited in certain instances by the fact that certain plastic materials may contain dangerous substances which can be leached into the food, and by the fact that, above certain temperatures, such materials may break down to release dangerous substances. Because they are inert to attack from almost all chemical substances, glass vessels and glass lined metal vessels have found practical use in a number of applications in the chemical processing and transportation industries, as well.

While the use of glass piping in food and chemical processing applications offers many advantages, tubular glass is rarely used for anything other than small structures because the brittleness of glass makes large tubes hard to handle and to install, and because a simple method for joining sections of relatively large glass pipe has not been found. Before the many advantages of glass lined piping can be widely used, solutions to the above problems must be found.

DESCRIPTION OF THE PRIOR ART

U.S. Pat. No. 2,907,351, issued to Rohrback, et al. on Oct. 6, 1959, describes the use of a protective sheath made from neoprene or other suitable synthetic rubber over the outside of a section of steel pipe used as a casing in an oil well. A section of this sheath is placed over each individual pipe section, with a skirt portion of the sheath being doubled back, away from one end of the pipe. A portion of pipe is left exposed, either at the end opposite to the skirt or adjacent thereto, so that the pipe can be grasped with ordinary tools. After two sections of pipe are joined with a collar, a split section of this sheath is fit over this exposed section, and the skirt portion is folded outward over this split section, over the collar, and over a portion of the sheath of the adjacent pipe section. This method forms a reliable way of protecting the outer surface of a steel pipe from corrosion due to ground water, particularly when compared to the traditional method of using concrete encasements, where channels can be formed in the concrete material as it is flowed into place, or cracks can develop in the concrete allowing water to seep towards the pipe and ultimately corrode the pipe.

U.S. Pat. No. 3,192,955, issued to Buck, et al. on Jul. 6, 1965, describes a pipeline consisting of sections including a resinous inner pipe and a steel outer pipe, with a hydrocarbon gel occupying the annular space therebetween. The resinous inner pipe, which provides an impermeable, corrosion resistant layer, can be made from any impermeable, substantially rigid resinous material, such as solid polymers of olefins, nylon, PVC (polyvinylchloride), and mixtures thereof. The hydrocarbon gel can be made by mixing a liquid hydrocarbon having a high boiling point, such as gasoline or kerosine, with a gelation agent, such as a hydrocarbon soluble acrylic resin. This gel is pumped into a conduit near one end of a section of pipe, while air is allowed to escape through a conduit near the opposite end. Sections of pipe can be joined by the ends of the resinous inner pipe sections extending outward to be bolted between flanges of adjacent outer pipe sections.

U.S. Pat. No. 3,338,742, issued to Mowell, et al. on Jun. 18, 1968 describes a pipeline built from welded sections, each including an outer casing pipe and inner conduit pipe. This pipeline is particularly constructed to allow thermal expansion and contraction of the inner pipe when the pipeline is used for transporting cryogenic liquids, such as liquefied natural gas (LNG) at about −260° F. Near one end of each section, the inner pipe is welded to the outer pipe using spacers extending through the annular region therebetween. Near the opposite end of each section, inwardly extending spacers are welded only to the outer pipe, and clearance is provided so that this portion of the inner pipe can slide relative to the outer pipe. Sections of insulation material are also installed between the inner and outer pipes. To allow for axial expansion and contraction, bellows structures are welded between adjacent sections of the inner pipe. Bands are welded between adjacent sections of the outer pipe, which may be subsequently covered with a concrete jacket to provide the mass necessary for holding the pipeline on the bottom of the sea in an intended application connected to an offshore tanker loading station, and to provide an environmentally protective coating about the outer pipe.

U.S. Pat. No. 3,677,303, issued to Martin on Jul. 8, 1972, describes a conduit including an inner pipe, which may be metal, plastic, asbestos cement, or other suitable material, and an outer casing, which is larger in diameter and shorter in length than the inner pipe. The outer casing includes a coaxial pair of plastic tubes, with a corrugated structure and a foamed resin, such as polyurethane, filling the annular space therebetween. In a first version, the space between the inner pipe and the outer casing is also filled with foamed resin, and sections of the conduit are joined by slipping a band over sleeves fastened over the outside of the outer casing tube near each end. An O-ring seals the sleeves and band at each side, and resin foam is then poured into the area enclosed by the sleeve. In a second version, the space between the inner pipe and the outer casing is an air space except for a number of pipe supporting disks, and insulating tube sections over the inner pipe between these disks. Each disk has a central hole engaging the outer surface of the inner pipe and a corrugated outer surface engaging the inner surface of the casing.

U.S. Pat. No. 4,516,608, issued to Titus et al. on May 14, 1985, describes an elongated tubular member including a fiber reinforced organic resin tube, such as a tube reinforced by glass fibers, and a tube made from a refractory material, such as a tube made from a plurality of annular ceramic segments bonded together. The refractory tube may be inside or outside the resin tube, and a polytetrafluoroethylene layer may be placed between these tubes. This type of construction is used to provide structural properties which could not be obtained using the resin tube alone. For example, a column made of resin tubes is too flexible to provide adequate compressive strength.

U.S. Pat. No. 4,590,971, issued to Webster et al. on May 27, 1986, describes an insulated pipeline having spaced sections of heat insulating material held between a continuous corrosion resistant coating on the steel pipe and an outer protective jacket. This pipeline is designed particularly for the transportation of crude oil under the North Sea. Thermal insulation is required to keep the oil, which leaves the well as about 48° C., above 23° C. to prevent waxing. The corrosion resistant coating, of polychloroprene rubber, is 6 mm thick. The insulation material consists of sections forming portions of a cylinder having a wall thickness of 50 mm, made from rigid polyvinylchloride foam. The outer abrasion resistant jacket is made from 6 mm thick polyurethane. This material also extends inward as a filler between adjacent sections of insulation material. This construction allows for flexure when the pipeline comes to rest on the uneven sea floor and for thermal expansion and contraction.

SUMMARY OF THE INVENTION

In accordance with one aspect of the invention, there is provided a composite pipe section including an inner pipe of a first length having a tubular central structure, a first end structure at one end, and a second end structure at an opposite end. The second end structure is configured to form a seal with a first end structure engaged in axial alignment therewith. In addition, the composite pipe section includes an outer structure of a second length, greater than the first length. The outer structure has a rigid pipe, first coupling means extending from a one end and second coupling means extending from an opposite end. The second coupling means is configured to engage a first coupling means placed in axial alignment therewith and to hold such first coupling means in engagement therewith. Finally, the composite pipe includes a resilient structure extending within an annular space between the inner pipe and the outer structure. The resilient structure holds the inner pipe in coaxial alignment within the outer structure and axially within the outer structure so that the outer structure extends, at each end, beyond the first and second end structures of the inner pipe.

BRIEF DESCRIPTION OF THE DRAWINGS

One preferred embodiment of the subject invention is hereafter described with specific reference being made to the following Figures, in which.

DETAILED DESCRIPTION

Figure 1:
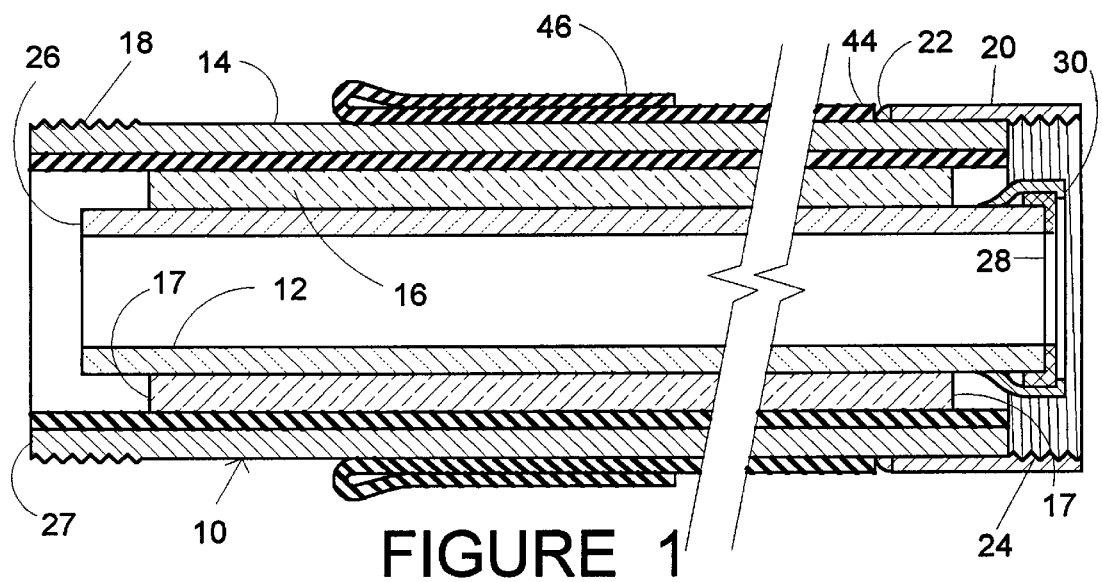
FIG. 1 is a cross-sectional elevation of a section of pipe built in accordance with of this invention.

FIG. 1 shows a section of pipe 10, built in accordance with a first embodiment of this invention, including an inner pipe 12, which is preferably a glass tube, held in a coaxial relationship with a rigid outer pipe 14, which is preferably a steel pipe. The coaxial relationship is maintained by a resilient structure 16 filling most of the annular space between pipes 12 and 14. Resilient structure 16 is may be a foam elastomeric resin, such a polyurethane foam, and can either be foamed in place during manufacture or may be inserted into the opening of outer pipe 14 in an integral unit with inner pipe 12. During an in place foaming manufacturing process, inner pipe 12 is held co-axially within outer pipe 14 by means of fixtures (not shown) at each end, which provide apertures for the injection of the material and for the escape of gasses. These fixtures (not shown) may also be used to form the end surfaces 17 of resilient structure 16. This process typically produces an elastomeric foam structure which tightly adheres to adjacent surfaces, such as the outer surface of pipe 12 and the inner surface of pipe 14.

Figure 2:
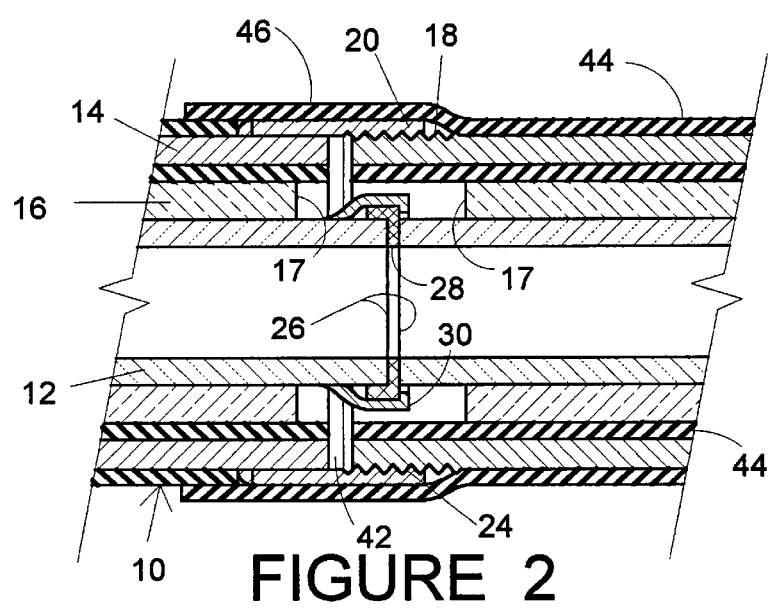
FIG. 2 is a cross-sectional elevation of portions of two sections of pipe, as shown in FIG. 1, joined to form part of a pipeline.

Pipe section 10 is particularly structured for attachment to other similar sections 10, as shown in FIG. 2. One end of outer pipe 14 includes an externally threaded portion 18, and a steel coupling 20 is fastened over the opposite end of outer pipe 14. Coupling 20 may be formed by welding a fillet 22 around the opposite end and including an internally mating threaded portion 24 within that portion of fillet 22 extending beyond the edge of pipe 14. With this construction, a number of adjacent pipe sections 10 can be joined in alignment by screwing externally threaded portions 18 into the internally threaded portions 24 of the adjacent sections 10.

The length of inner pipe 12 is shorter than the combined length of outer pipe 14 and coupling 20. Inner pipe 12 is laterally positioned within section 10 so that face surfaces 26 of inner pipe 12 are both inward from the adjacent face surfaces 27 of outer pipe 14 and sleeve 16. Thus, both ends of inner pipe 12 are protected from damage, which might otherwise occur during handling before section 10 is assembled into a pipeline with other sections, by the overhanging and encircling end portions of outer pipe 18 and coupling 20. To permit two sections 10 to be attached together, a gasket 28 is placed over the end of inner pipe 12 encircled by coupling 20 and gasket 28 is held in place by a retaining bracket 30. Gasket 28 and bracket 30 are sized so that they also are held within the protective length provided by extending outer pipe 14 and coupling 20.

Figure 3:
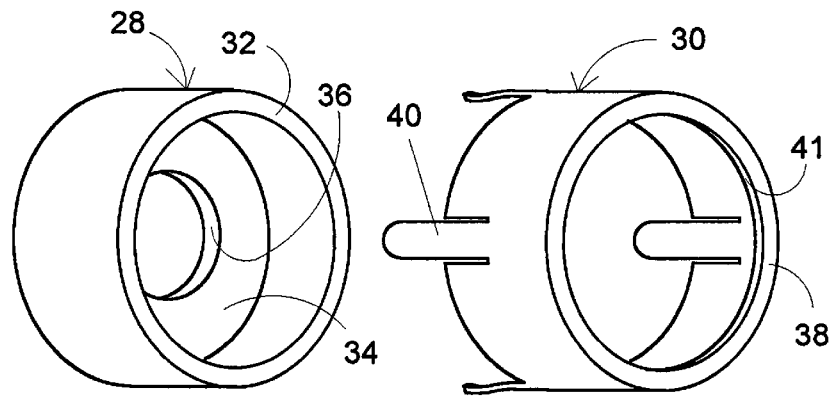
FIG. 3 is an isometric view of a gasket and a gasket retaining bracket, used in the pipe shown in FIG. 1, shown in an exploded relationship.

As shown in FIG. 3, gasket 28 includes a rim 32 extending axially from each side of a web 34, which extends inward to a central hole 36. Retaining bracket 30 includes a cylindrical portion 38, sized to be placed over gasket 28, and a number of axially extending legs 40. Legs 40 provide contact surfaces on the outer surface of inner pipe 12 at the outward extending portion thereof beyond end surface 17 of resilient structure 16. Cylindrical portion 38 of bracket 30 includes a small lip 41 extending inward to hold gasket 28 in place within bracket 30. Retaining bracket 30 is thus used to hold gasket 28 in place over an end of inner pipe 12, with web 34 extending over an end surface 26 of pipe 12. While gasket 28 is preferably composed of a solid elastomeric resin, such as neoprene or polyurethane, retaining bracket 30 may be fabricated from a metal sheet using stamping and drawing processes, or bracket 30 may alternately be molded from a solid resin, such as polycarbonate.

Referring again to FIG. 2, when two pipe sections 10 are screwed together, the opposite sides of web 34 of gasket 28 are trapped between the adjacent ends 26 of the inner pipes 12 of the two sections 10. A relationship is maintained among the lengths of pipes 12 and 14 and the lengths of threaded portions 18 and 24, so that a gap 42 remains in the threaded engagement portion of adjacent sections 10 when contact is made between the inner pipe face surfaces 26 and both sides of web 34. Thus, the pressure exerted upon web 34 compresses this web to form a fluid tight seal against both ends of inner pipe faces 26. Central hole 36 in web 34 aligns with the holes through inner pipes 12, providing a channel for the passage of fluids through the pipeline.

The inner and outer surfaces of outer pipe 14 may be protected from corrosion through the use of various types of coatings, such as zinc plating, or various elastomeric materials. Referring again to FIG. 1, for harsh environments, and for applications where damage due to contact with the pipeline can be particularly serious, additional protection can be applied to the outside of pipe 14 in the form of a protective sheath 44 stretched over this surface to a point near welded edge 22 of coupling 20. This sheath 44, which is preferably made from a solid elastomeric resin, such as a neoprene or polyurethane rubber, may be attached to the outside surface of outer pipe 14 through the use of an adhesive or merely by the establishment of tensile circumferential stress in the sheath 44 as it is installed. Sheath 44 may also be applied to encase pipe 44 entirely, that it, cover both the inside and outside thereof.

Sheath 44 includes, near the end of outer pipe 14 having external threads 18, a skirt portion 46 which is folded back, away from these external threads 18, over the part of remaining portion of sheath 44. External threads 18 are thus exposed for the installation of a coupling 20 from an adjacent pipe section 10, and an portion of the outer surface of pipe 14 adjacent to these threads 18 is also exposed so that ordinary tooling, such as a pipe wrench, may be applied to pipe 14 in this region for tightening pipe 14 into such a coupling 20 from an adjacent section 10. As seen in FIG. 2, after adjacent pipe sections 10 are assembled together, skirt portion 46 is drawn over coupling 20 and over a part of the sheath 44 of the adjacent pipe section 10, forming a hermetic seal to prevent the migration of ambient fluids to the surfaces of outer pipes 12 and coupling 20. Alternatively, skirt 46 may be replaced by a protective material wrapped around the threads 18.

Figure 4:
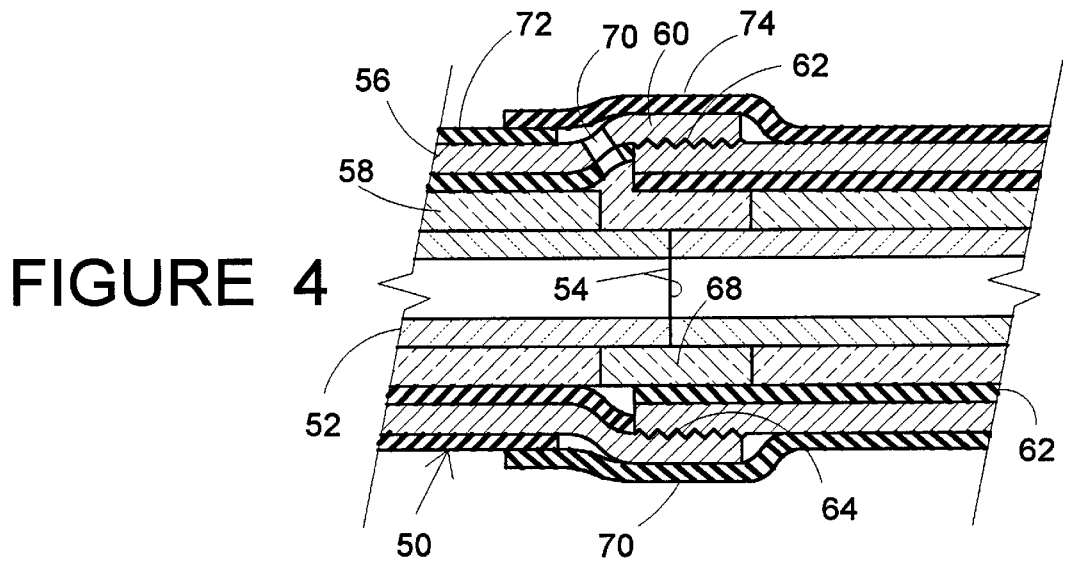
FIG. 4 is a cross-sectional elevation of portions of two sections of pipe, built in accordance with a second embodiment of this invention, joined to form part of a pipeline.

FIG. 4 is a cross-sectional elevation of portions of two pipe sections 50, built in accordance with a second embodiment of this invention, joined to form part of a pipeline. Each section 50 includes an inner pipe 52, which is preferably a glass tube having an accurately ground face 54 at each end, an outer pipe 56, which is preferably a steel pipe, and an insulating structure 58, which is preferably formed from a foamed elastomeric resin, extending therebetween. As in the first embodiment, the inner pipe is suspended within, and protected by, the steel outer pipe.

One end of each outer pipe 56 includes a diametrically enlarged portion 60, in which internal threads 62 are formed, while external threads 64 are formed on an opposite end of outer pipe 56. Internal threads 62 mount with external threads 64, so that a number of pipe sections 50 may be fastened together to form a pipeline. Thus, the forming of an internally threaded, enlarged section 60 is functionally equivalent to the attachment of an internally threaded coupling 20 (shown in FIGS. 1 and 2); if the screw threads are compatible, outer pipe sections formed using each of these techniques can be mated.

In the example shown in FIG. 4, separate parts such as gasket 28 and retaining bracket 30 (shown in FIG. 3) are not used to seal a gap between inner pipes 52. Instead, one or both of the end faces 54 may be coated with a solid elastomeric resin, so that a fluid tight seal is established between these faces 54 as two pipe sections 50 are fastened together. To provide further support for inner pipes 52 where they are coupled together, an optional additional insulating structure 68 may be formed around the ends of these pipes 52 after outer pipes 56 are screwed together. Insulating structure 68 may be inserted as an integral piece prior top screwing the two adjacent sections together. Alternatively, two holes 70 may be provided in the transitional part of outer pipe 56 adjacent to its diametrically enlarged portion 60. One of holes 70 may be used to fill the space around the ends of inner pipes 52, while gasses are allowed to escape through the other hole 70.

As previously discussed in reference to FIGS. 1 and 2, an additional elastomeric sheath 72 may be provided for use in harsh environments to protect the inside and/or outside surfaces of outer pipes 56 from corrosion. This sheath 72 includes a skirt portion 74, which is initially folded back, away from external threads 64, and which is folded out straight to cover enlarged portion 60 of an adjacent attached adjacent pipe section 50.

Figure 5:
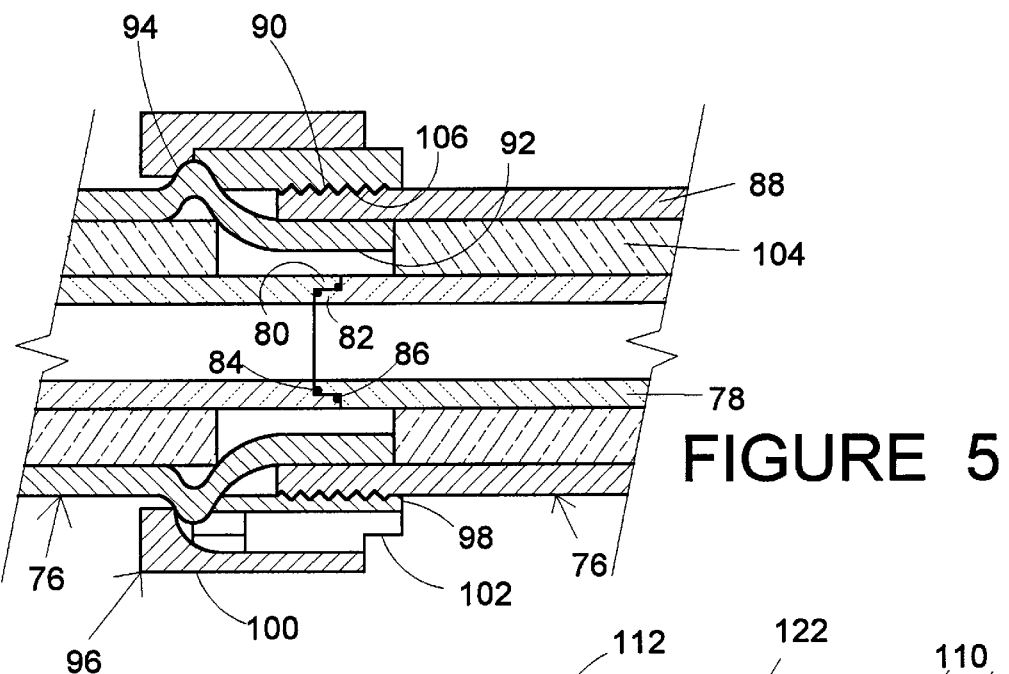
FIG. 5 is a cross-sectional elevation of portions of two sections of pipe, built in accordance with a third embodiment of this invention, joined to form part of a pipeline.
Figure 6:
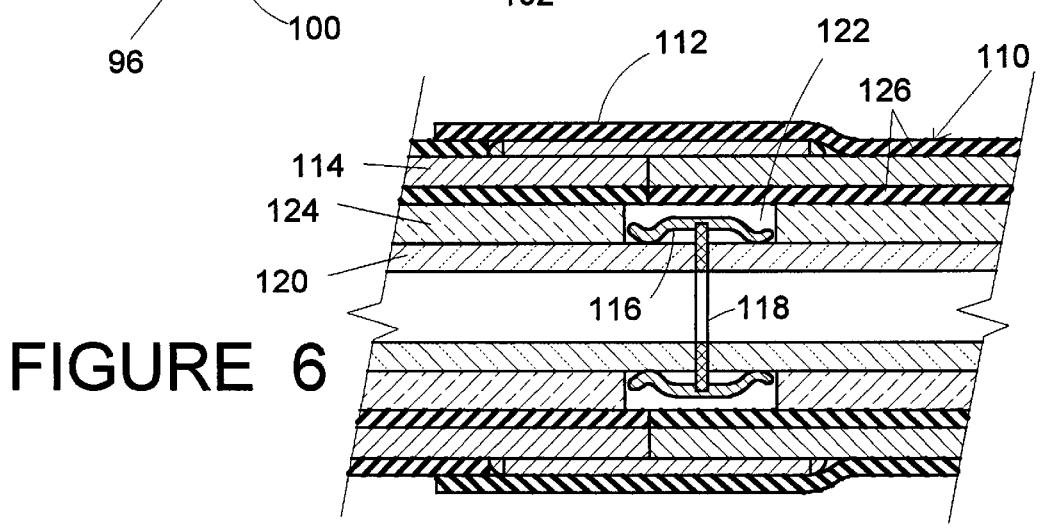

FIG. 5 is a cross-sectional elevation of portions of two pipe sections 76, built in accordance with a third embodiment of this invention, joined to form part of a pipeline. In this embodiment, each end of inner pipe 78 is formed to provide an aligning surface mating with the opposite end of this pipe 78, so that, when a number of sections 76 are assembled into a pipeline, adjacent inner pipes 76 will be aligned by their end surfaces. In the example shown, an outer overlapping section 80 is formed at one end of each inner pipe 76, to encircle an inner extending section 82 at an opposite end of an inner pipe 76 from an adjacent attached section 76.

A fluid tight seal around the joint between adjacent inner pipes 76 is further formed through the use of an O-rings 84 and 86, which may be of standard types readily available in a number of elastomeric materials. O-rings 84 and 86 are located at internal corners of sections 80 and 82, where these corners are preferably grooved for receiving the O-rings and for reducing the stress concentration which would otherwise occur at sharp corners in these locations. O-ring 84 is fit into a groove extending inward from the circular internal corner of outer overlapping section 80, while O-ring 86 is fit into a groove extending inward from the circular internal corner of inner extending section 82. The outer diameters of O-ring 84 and of inner extending section 82 are about equal to the inner diameter of O-ring 86. Mounting O-rings in grooves in this way provides the additional advantage of avoiding the generation of the high forces required to provide fluid tight sealing as the adjacent inner pipes are brought together, until the motion required to bring these pipes together is nearly completed. O-rings 84 and 86 may be placed within these grooves during the process of manufacturing pipe sections 76. Additional gasket materials, such as an elastomeric coating applied to the outer cylindrical surface of inner extending section 82, may be used to enhance the seal formed by O-rings 84 and 86.

In the example of FIG. 5, a method is provided to allow the attachment of outer pipes 88, one to another, without requiring the rotation of one pipe section 76 relative to the other. Each outer pipe 88 has, at one end, an externally threaded portion 90 as previously described relative to FIGS. 1, 2, and 4. However, at the opposite end, each outer pipe includes a diametrically smaller portion 92 which slides inside externally threaded portion 90 as pipe sections 76 are assembled to one another. Each outer pipe 88 also includes a circumferential outward extending ridge 94 adjacent to smaller portion 92. A coupling 96, mounted to revolve on ridge 94, is assembled in place with an inner coupling portion 98 and an outer coupling portion 100 forming opposite sides of a groove aligned on ridge 94. Relative motion between coupling portions 98 and 100 may be prevented, for example, by a tightly fitting key 102 forced into slots in portions 98 and 100.

While the diametrically smaller portion 92 provides an alignment function in the preferred version of this embodiment shown in FIG. 5, it is understood that this portion 92 could alternately be omitted, with surrounding coupling 96 providing protection to the extending end of inner pipe 78 before installation. As previously explained, each pipe section 76 also includes an insulating structure 104, which may be formed during the manufacture of the pipe section 76 by injecting an elastomeric resin foam into the annular space between inner pipe 78 and outer pipe 88. Alternatively, the attachment of the two pipe sections 76 may be accomplished using a pair of facing flanges.

When pipe sections 76 are assembled into a pipeline, the rotation of coupling 96 provides the axial engagement motion required for assembly through the engagement of internal threads 106 of inner coupling portion 98 with the external threaded portion 90 of an adjacent pipe section 76. Coupling 96 may include outer surface features such as flats, knurled ridges, or holes to facilitate grasping for rotation by tooling or by hand. Since this assembly process does not involve the rotation of either of the pipe sections 90 to be assembled, it is particularly desirable under conditions where it is necessary to join portions of a pipeline at a central point, and to join portions of a pipeline including curved sections or various types of attached hardware. The threads of externally threaded portion 90 and internal threads 106 of coupling 96 may be made compatible with external threads 18 and 64, with the threads of internally threaded portion 24, and with internal threads 62, so that, with compatible end configurations for internal pipes, pipe sections including rotating couplings 96 may be used with pipes sections using outer pipes built as described in reference to FIGS. 1, 2, and 4.

The preceding discussion has described pipe sections 10, 50 and 76 using three different versions of couplings between outer pipes 14, 56 and 88, three different versions of engagement between inner pipes 12, 52 and 78, and an optional outer sheath 44 and 72 or an sheath interior to pipe 12 (not shown) to be applied to pipe sections constructed for use under harsh conditions. It is understood that a pipe section could be built using any combination of these features to advantage without departing from the spirit and scope of the invention.

In all of these embodiments and versions thereof, relatively strong and stiff outer pipe sections 10, 50 and 76 are joined, one to another, to provide strength and rigidity to the pipeline. The assembly and disassembly of a pipeline is accomplished through the use of a simple rotational motion, which, depending on factors such as the size of the pipe sections 10, 50 and 76, can easily be applied by hand or with easily available tools. This attachment is made, either by means of the direct engagement between screw threads 18 or 62 of adjacent outer pipe sections, or by means of the engagement of a coupling 96 rotatably attached to one outer pipe section 88 with threads 90 on the other outer pipe 88 section. This method provides for alignment of adjacent pipe sections by means of the outer pipes thereof, and provides advantages of increased joint strength and rigidity, as well as of ease of assembly, relative to a method of the prior art, as described in U.S. Pat. No. 3,677,303 to Martin, wherein a sleeve is used to bridge a gap between adjacent pipe sections, being attached to each pipe section by means of an O-ring being forced into an outer groove around the pipe section and an inner groove in the sleeve. Furthermore, the method of this invention provides an ease of assembly and disassembly advantage over other composite pipe constructions described in the prior art, such as that of U.S. Pat. No. 3,388,724 to Mowell, et al., where welding is used to join both inner and outer pipe sections.

As explained above, inner pipe 12, 52 or 78 is suspended within the outer pipe 14, 56 or 88 by means of an insulating structure 16, 58 or 104, which may be inserted with inner pipe 12, 52 or 78 or which may be formed by injecting an elastomeric resin foam into the annular space between the outer pipe 14, 56 or 88 and inner pipe 12, 52 or 78. The insulating material 16, 58 and 104 may be preferably to provide thermal insulation, which is particularly desirable when a hot or cold fluid is pumped through the inner pipe 12, 52 or 78. Similarly, mechanical protection of the inner pipe 12, 52 or 78 is provided from shocks which may occur during the laying of the pipeline, or thereafter, due to excavation operations, earthquakes, explosions, and so on. Shocks occurring at the surface of the outer pipe 14, 56 or 88 are greatly attenuated as they are transmitted to the inner pipe 12, 52 or 78. The resilient mounting of the inner pipe 12, 52 or 78 provides an allowance for the thermal expansion and contraction of this pipe.

Since the outer pipe 14, 56 or 88 and couplings thereof extend past the ends 26 or 54 of the inner pipe 12, 52 or 78 at each end of a pipe section 10, 50 or 76, the strength and rigidity of the outer pipe 14, 56 or 88 protects the inner pipe 12, 52 or 78 in pipe sections 10, 50 or 76 during handling and shipment, as well as during and after installation. As shown in FIGS. 2, 4, and 5, the extension of outer pipe 14, 56 or 88 to assure protection for the ends of the inner pipe 12, 52 or 78 before installation, requires that adjoining outer pipe 14, 56 or 88 overlap one another where they are joined, with the joint formed between the corresponding inner pipe 12, 52 or 78 sections falling entirely within this overlap region. This construction provides a significant advantage in the form of protection for the inner pipe 12, 52 or 78, over the construction described in U.S. Pat. No. 3,677,303 to Martin, which requires that the inner pipe thereof protrude past the ends of the outer pipe, or casing, at both ends.

The construction described in reference to FIGS. 1 through 4 are particularly useful in providing an attachment means for segments of a glass pipeline, since it is necessary only to cut a long glass tube into sections of appropriate length during the manufacture of the pipe segments. The cutting process can be used to provide accurate and smooth end surfaces, or a simple grinding procedure may be used after initial cutting. Fluid tight sealing is achieved against the end surfaces, providing a particular advantage, since the manufacturing processes which produce glass tubes do not typically provide accurate inside or outside surfaces against which seals may be pressed to produce reliable fluid tight sealing.

The materials used in the construction of pipe sections 10, 50 or 76 can be varied, without departing from the scope of the invention, in order to obtain useful properties for different types of fluids to be transported, for different types of installation procedures, or for different operating environments. While this invention is particularly useful in providing means to allow the simple attachment of sections of a glass inner pipeline, and in protecting such a pipeline from damage before, during, and after installation, other materials, such as tubes made from thermoplastic resins may alternately be used for the inner pipe sections. While glass provides outstanding surface properties relative to the transportation of food products and corrosive chemicals, many thermoplastic resins provide improved impact strength and other mechanical properties. The use of such materials may be particularly appropriate for an inner tubing configuration as described in reference to FIG. 5, where a relatively complex end shape is required, and where flexural stresses may be developed in the attachment process. The choice of materials for gaskets, O-rings, and resilient structures can be varied in accordance with the composition and temperature of the fluid being transported. While the outer pipe has been described as a steel pipe, other metals could be used, as could rigid tubing made using a thermoplastic resin.

This invention can also be of use in providing an underground conduit for electrical wires. In this application, the use of a steel outer pipe, together with a plastic inner pipe, should provide excellent protection against the interruption of electrical or communication services due to an excavation accident.

What is claimed is:

1. A composite pipe section comprising:
   an inner glass pipe of a first length having a tubular central structure, a first end structure at one end, and a second end structure at an opposite end, said second end structure being configured to form a seal with an adjacent first end structure engaged in axial alignment therewith;
   an outer structure of a second length, greater than said first length, said outer structure having a rigid pipe, first coupling means extending from a one end and second coupling means extending from an opposite end, said second coupling means being configured to engage said first coupling means placed in axial alignment therewith and to hold said first coupling means in engagement therewith; and
   a resilient structure extending fully within an annular space between said inner pipe and said outer structure, said resilient structure holding said inner pipe in coaxial alignment within said outer structure and axially within said outer structure so that said outer structure extends at each end beyond said first and second end structures of said inner pipe.

2. The pipe section of claim 1, wherein said first coupling means includes an externally threaded surface extending from said rigid pipe.

3. The pipe section of claim 2, wherein said second coupling means includes a sleeve fastened to and extending from said rigid pipe, said sleeve including an internally threaded surface configured to mate with said externally threaded surface of said first coupling means.

4. The pipe section of claim 2, wherein said second coupling means includes a coupling member rotatably mounted on a rigid pipe of an adjacent pipe section, said coupling member including an internally threaded surface configured to mate with said externally threaded surface of said first coupling means.

5. The pipe section of claim 4, wherein said second coupling means further includes alignment means extending from said rigid pipe, said alignment means being configured to slide within said first coupling means.

6. The pipe section of claim 1, wherein one of said end structures includes an elastomeric gasket and a bracket, said gasket including a central hole and a surface extending across an end structure of said tubular section and said bracket attaching said elastomeric gasket to said inner pipe so that said central hole is aligned with a hole extending within said inner pipe.

7. The pipe section of claim 1, wherein said end structures include flat surfaces of said tubular central structure, extending perpendicularly to an axis of said tubular central structure, at least one of said flat surfaces being coated with an elastomeric resin.

8. The pipe section of claim 1, wherein said first end structure includes a cylinder extending axially from said tubular central structure and said second end structure includes a cylindrical portion configured to engage and surround said cylinder extending from said first end structure.

9. The pipe section of claim 1, further including an elastomeric sheath over a portion of said outer structure of sufficient thickness to provide protection against physical contact with said pipe section.

10. The pipe section of claim 9, wherein said elastomeric sheath includes a skirt portion folded outwardly against the remaining portion of said sheath, exposing both said first and second coupling means, said sheath having a length, when straightened, greater than said second length.

11. The pipe section of claim 1, wherein said rigid pipe is made of metal.

12. The pipe section of claim 1, wherein said resilient structure is made of a foam material.

13. A pipeline including a plurality of sections fastened together, said pipeline comprising:
   an inner glass pipeline having a plurality of inner tubular sections held in alignment and in engagement at inner joints, and means at said inner joints for forming seals around a central aperture extending axially through said inner pipeline;
   an outer pipeline including a plurality of outer tubular sections and means for fastening said outer tubular sections together at outer joints, said outer joints including overlapping portions of axially adjacent outer tubular sections, each overlapping portion extending in both axial directions past an inner joint; and
   a plurality of resilient structures, each resilient structure extending fully between a single one of said inner tubular structures and a surrounding single one of said outer tubular structures, said resilient structures holding said inner tubular structures individually in coaxial alignment with said surrounding outer tubular structures.

14. The pipeline of claim 13, wherein said means for fastening comprises each overlapping portion including an inner coupling portion extending from one end of each outer tubular section and having an externally threaded surface and an outer coupling portion extending from the other end of each outer tubular section axially adjacent to said outer tubular section and having an internally threaded surface engaging said externally threaded surface.

15. The pipeline of claim 13, wherein said overlapping portion includes an inner alignment portion extending from said outer tubular section, and said means for fastening includes a central coupling portion extending from said outer tubular section axially adjacent to said outer tubular section, said central coupling portion being slid over said inner alignment portion, said central coupling portion including an externally threaded surface, and an outer coupling portion rotatably mounted on said outer tubular section, said outer coupling portion including an internally threaded surface engaging said externally threaded surface.

16. The pipeline of claim 13:

wherein each inner tubular section includes flat ends perpendicular to an axis thereof; and wherein said means for forming seals comprises each inner joint including an elastomeric gasket, pressed between two adjacent tubular sections having said central aperture.

17. The pipeline of claim 13, wherein each inner joint includes a cylindrical surface extending axially from an end of a tubular section, said cylindrical surface extending into a cylindrical section on an adjacent end of an adjacent tubular section.

18. The pipeline of claim 13, further including an elastomeric sheath over said outer pipeline, said elastomeric sheath including a plurality of cylindrical elastomeric sections, each of which extends from a position around an outer tubular section to a position around an adjacent outer tubular section, each elastomeric section further extending around a portion of an adjacent elastomeric sheath on an adjacent outer tubular section, said sheath having a thickness sufficient to provide protection against physical contact with said pipe section.

19. The pipeline of claim 13, wherein said outer tubular sections are made from metal.

20. The pipeline of claim 13, wherein said resilient structures are made from a foam material.

21. A composite pipe section comprising:

an inner glass pipe of a first length having a tubular central structure, a first end structure at one end, and a second end structure at an opposite end, said second end structure being configured to form a seal with an adjacent first end structure engaged in axial alignment therewith, one of said end structures including an elastomeric gasket and a bracket, said gasket including a central hole and a surface extending across an end of said tubular section and said bracket attaching said elastomeric gasket to said inner pipe so that said central hole is aligned with a central aperture extending within said inner pipe;

an outer structure of a second length, greater than said first length, said outer structure having a rigid pipe, first coupling means extending from a one end and second coupling means extending from an opposite end, said first coupling means including an externally threaded surface extending from said rigid pipe, said second coupling means being configured to engage said first coupling means placed in axial alignment therewith and to hold said first coupling means in engagement therewith;

said second coupling means including a sleeve fastened to and extending from said rigid pipe, said sleeve including an internally threaded surface configured to mate with said externally threaded surface of said first coupling means, second coupling means further including alignment means extending from said rigid pipe, said alignment means being configured to slide within said first coupling means;

a resilient structure extending fully within an annular space between said inner pipe and said outer structure, said resilient structure holding said inner pipe in coaxial alignment within said outer structure and axially within said outer structure so that said outer structure extends at each end beyond said first and second end structures of said inner pipe; and an elastomeric sheath over said outer structure of a thickness sufficient to provide resilient protection against contact with said composite pipe section, said elastomeric sheath including a skirt portion folded outwardly against the remaining portion of said sheath, exposing both said first and second coupling means, said sheath having a length, when straightened, greater than said second length.

* * * * *